United States Patent
Papish et al.

(10) Patent No.: US 8,756,620 B2
(45) Date of Patent: Jun. 17, 2014

(54) SYSTEMS AND METHODS FOR TRACKING CONTENT SOURCES FROM WHICH MEDIA ASSETS HAVE PREVIOUSLY BEEN VIEWED

(75) Inventors: Michael Papish, Randolph Center, VT (US); Brian Fife, Concord, MA (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/589,411

(22) Filed: Aug. 20, 2012

(65) Prior Publication Data

US 2014/0049695 A1 Feb. 20, 2014

(51) Int. Cl.
*H04N 7/173* (2011.01)
*H04N 5/445* (2011.01)
*H04N 7/16* (2011.01)
*G06F 13/00* (2006.01)

(52) U.S. Cl.
USPC .................... 725/14; 725/9; 725/28; 348/732

(58) Field of Classification Search
USPC ................. 725/28, 29, 45, 46, 9, 14; 348/732
See application file for complete search history.

(56) References Cited

U.S. PATENT DOCUMENTS

| | | | | |
|---|---|---|---|---|
| 5,801,747 A | * | 9/1998 | Bedard | 725/46 |
| 2007/0079330 A1 | * | 4/2007 | Ludvig et al. | 725/38 |
| 2008/0259220 A1 | * | 10/2008 | Stahulak et al. | 348/734 |
| 2010/0083310 A1 | * | 4/2010 | Vanduyn et al. | 725/38 |

* cited by examiner

*Primary Examiner* — Pankaj Kumar
*Assistant Examiner* — Reuben M Brown
(74) *Attorney, Agent, or Firm* — Ropes & Gray LLP

(57) ABSTRACT

Systems and methods for tracking content sources from which media assets have previously been viewed are provided. A user request to access a first content source is received. Content currently being presented to the user from the first content source is monitored to determine whether the content meets a criterion. An amount of time the content being presented meets the criterion is measured. In response to determining the amount of time exceeds a threshold, an identifier of the first content source is stored in a list of content sources from which content meeting the criterion was previously presented to the user. Content received from one of the content sources in the list is presented each time a user request to access a last content source is received.

18 Claims, 7 Drawing Sheets

SYSTEMS AND METHODS FOR TRACKING CONTENT SOURCES FROM WHICH MEDIA ASSETS HAVE PREVIOUSLY BEEN VIEWED

BACKGROUND

Traditional systems with a "last channel" or "back" option enable users to alternate between a current channel and one or more previously tuned channels. However, the last channel option becomes burdensome when some of the previously tuned channels were only viewed in the process of browsing content and may not have actually been of interest to the user. In addition, these traditional systems sometimes blindly consider how long a given channel is tuned before including the channel in the last channel option. However, even in these cases, the channels included in the last channel option may still be undesirable because time by itself does not indicate an interest in content.

SUMMARY

In view of the foregoing, systems and methods for tracking content sources from which media assets have previously been viewed are provided. In particular, content sources from which content meeting a criterion for a threshold of time are stored and later accessed in a sequence based on a user command to access the last content source.

In some embodiments, a user request to access a first content source is received. In particular, the user may input a channel change command to tune to a new channel. The user request may include a content source identifier such as a website address or recording device selection. In response to the user request, content from the first content source may be presented to the user.

The content, received from the first content source, currently being presented to the user may be monitored to determine whether the content meets a criterion. A content attribute or characteristic associated with the content being presented may be retrieved from a database. The content attribute or characteristic may be compared with one or more criteria (e.g., genre, time of day, rating, commercial segment, etc.). The criteria may be specified by the user and stored and/or may be predefined and set to a default value. In some embodiments, content received from the first content source includes a program segment and an advertising segment. The content may be monitored to determine whether the content currently being presented corresponds to the program segment or the advertising segment. The content currently being presented may be determined to meet the criterion when the content currently being presented corresponds to the program segment.

In response to determining that the content attribute or characteristic matches the one or more criteria, an amount of time the content being presented with the matching attribute or characteristic is measured. While the content is being presented, characteristics or attributes of the content may continuously or periodically be compared with the one or more criteria. The measurement of the time the content being presented may be conditioned on the characteristics or attributes of the content matching the one or more criteria. Specifically, the amount of time may continue to be measured or incremented (e.g., every second) while the content attributes or characteristics match the one or more criteria. The amount of time may be paused or stop being measured or incremented while the content attributes or characteristics fail to match the one or more criteria.

The amount of time measured reflecting the content having the attributes or characteristics matching the one or more criteria may be compared with a threshold. The threshold may be user selected or predefined to be a default value. In response to determining that the amount of time exceeds the threshold, an identifier of the first content source may be stored in a list of content sources from which content meeting the criterion was previously presented to the user. The list may be sorted in any suitable manner. Specifically, the content source identifiers in the list may be sorted in the order in which they were added to the list (e.g., in a queue format). The content source identifiers in the list may be sorted or arranged in order of increasing or decreasing amount of time the content from the respective source was presented having matching characteristics or attributes.

In some embodiments, content received from one of the content sources in the list may be presented each time a user request to access a last content source is received. The request to access a last content source may be a dedicated key or option (e.g., a back option or back key). The request to access a last content source may be different from a channel change command (e.g., channel up, channel down command, specific channel tune command (i.e., entering a channel number to access)). Specifically, with each subsequent selection of a dedicated key or option (e.g., a back option), another content source identifier may be retrieved from the list based on the order in the list. The content from the content source identified by the identifier may then be presented to the user. Upon reaching the end of the list or the last content source in the list, the next selection of the dedicated key or option may cause the first content source identifier to be retrieved and corresponding content source to be accessed.

In some embodiments, a first channel is tuned in response to receiving the user request to access the first content source. After storing the identifier of the first channel in the list, a second channel may be tuned to present content received from the second channel in response to receiving a user request to tune to the second channel. A user request to access the last content source may be received. The identifier of the first content source in the list of content sources from which content meeting the criterion was previously presented to the user may be retrieved. The first channel may be tuned back or again based on the retrieved identifier.

In some embodiments, a user may request to change from a first content source to a second content source (e.g., tune to a new channel). The second content source may be presenting content that is in a plot portion. A determination may be made as to whether or not the content matches a criterion (e.g., whether the content is not in a commercial break). Because the content is in a plot portion and not in a commercial break, it may be determined that the content does match the criterion and a timer may start being incremented (e.g., every second). While the content is being presented, a determination of whether the content enters a commercial break and thereby does not match the criterion may continue to be made. As a result of the content entering a commercial break, the timer may be paused while the content is in the commercial break. As soon as the content returns to the plot portion and matches the criterion, the timer may resume measuring time. When the timer reaches a threshold, the second content source may be added to a list of previously accessed content sources.

The user may request to change from the second content source to a third content source (e.g., by issuing a channel up command). The content from the third content source being presented may be in a commercial break and thus does not match the criterion. In addition, the user may request to change from the third content source to a fourth content source before the timer measuring an amount of time the third content source is presenting content reaches the threshold. Accordingly, the third content source may not be added to the list of previously accessed content sources and the fourth content source may be accessed. While accessing content from the fourth content source, the user may issue a request to access a last content source and as a result the second content source may be accessed. Specifically, since the second content source is in the list of previously accessed content sources and is the next content source in the list, content from the second content source may be accessed.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
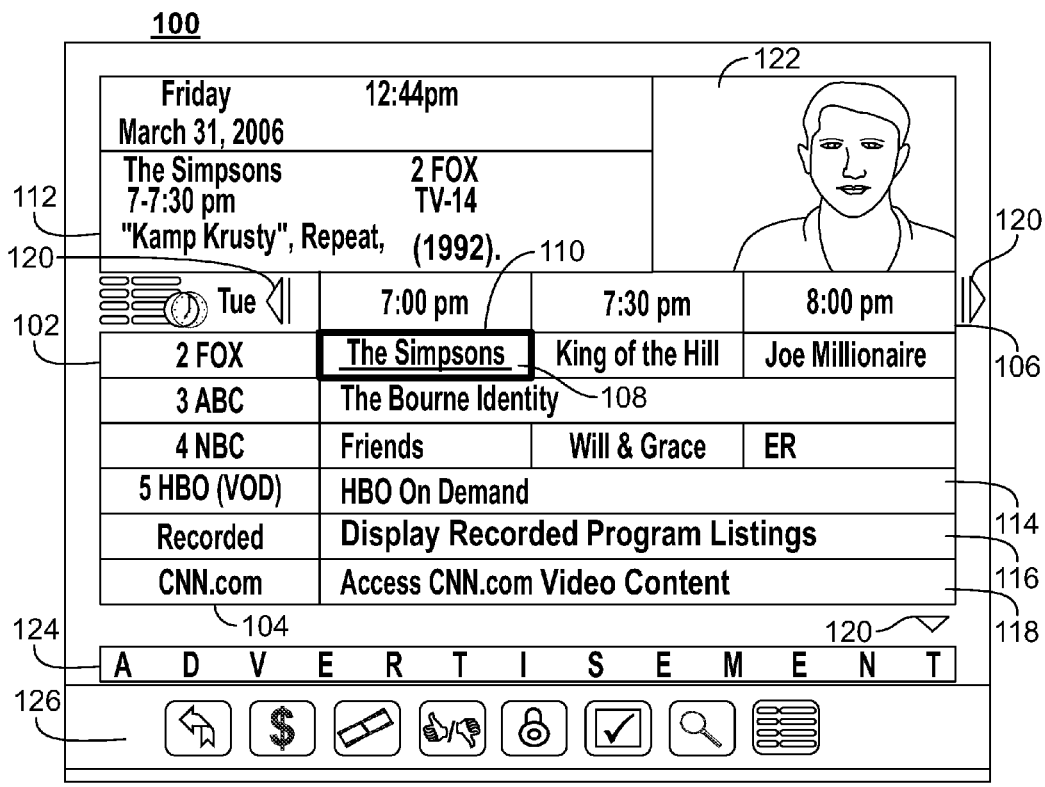
FIGS. 1 and 2 show illustrative display screens that may be used to provide media guidance application listings in accordance with an embodiment of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), messages from a crowd of users on a social network, messages from a crowd of users posted to a blog or website, genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections. In some implementations, this data may be referred to as a data feed. As referred to herein the term "crowd" should be understood to mean any number of users greater than one.

Figure 2:
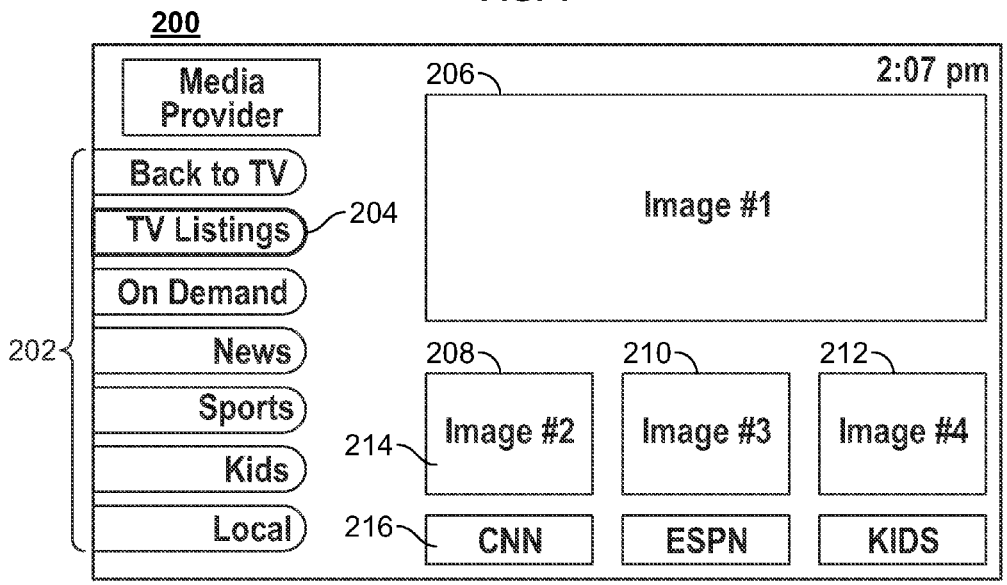

FIGS. 1-2 show illustrative display screens that may be used to provide media guidance data. The display screens shown in FIGS. 1-2 and 5-7 may be implemented on any suitable user equipment device or platform. While the displays of FIGS. 1-2 and 5-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

As referred to herein, the phrase "in response" should be understood to mean automatically, directly and immediately as a result of, without further input from the user, or automatically based on the corresponding action where intervening inputs or actions may occur.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110.

Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to, or alternative to, providing access to linear programming (e.g., content that is scheduled to be transmitted to a plurality of user equipment devices at a predetermined time and is provided according to a schedule), from content sources (e.g., television channels or scheduled streaming sources) the media guidance application may also provide access to non-linear programming (e.g., content accessible to a user equipment device at any time and not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other airtimes or ways of receiving a program, recording a program, enabling series recording of a program, setting program and/or channel as a favorite, purchasing a program, or other features. Options available from a main menu display may include search options, VOD options (e.g., fast-access playback operations), parental control options, Internet options, cloud-based options, device synchronization options, options to set up a timer for triggering addition of a channel in a last channel option, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. The user profile information may include identifiers of one or more social networks or blogs the user is associated with. For each social network or blog a username and password (e.g., log-in information) may be stored in the user profile information. Control circuitry 304 may utilize this information in the user profile to automatically access the social network or blog to post or transmit information/content/segments to or retrieve information/contents/segments from the social network or blog. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
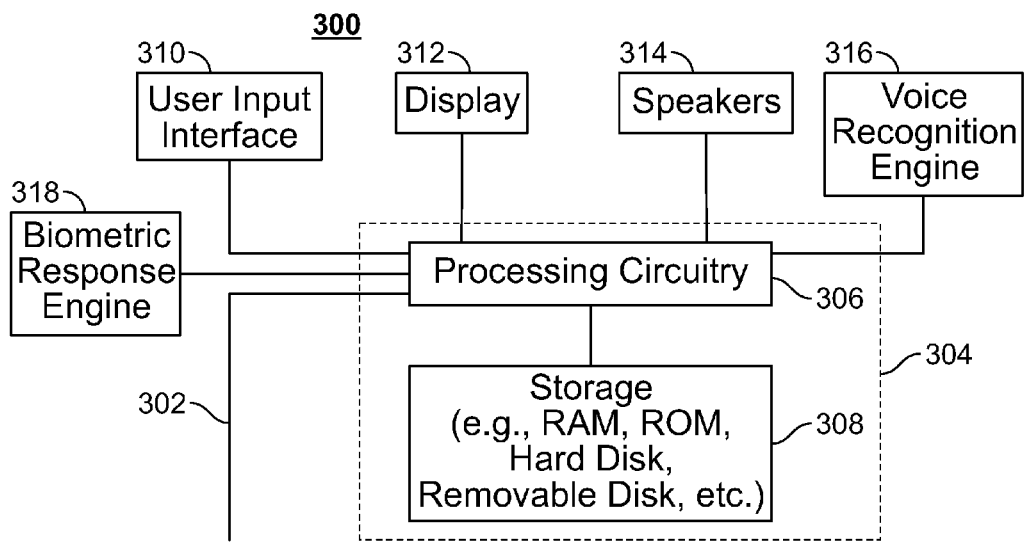
FIG. 3 shows an illustrative user equipment device in accordance with another embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

In some embodiments, a viewing history may be stored in storage 308 for a user. The viewing history may include indications of which media assets have been viewed by a given user. The viewing history may also include, for each media asset, which portion or portions have or have not been viewed by the user. In some implementations, the viewing history may include indications of which users in a group of users have seen or viewed a media asset or a particular segment of a media asset. The group of users may be users in a certain geographical location (e.g., in the same home) or users that are associated with each other on a social network.

In some embodiments, a list of content sources from which content meeting criteria was previously presented to the user may be stored in storage 308. The list may be stored in a volatile section of storage 308 so that the list is cleared when the user equipment 300 is turned OFF. Alternatively, the list may be stored in a non-volatile section of storage 308 so that it remains available until manually or automatically (e.g., after a predetermined period of time) being erased. Control circuitry 304 may monitor the content being presented on a content source currently being accessed to determine whether the criterion is met. Control circuitry 304 may measure the length of time the content being presented meets the criterion, and upon the length of time exceeding a threshold, control circuitry 304 may add the content source to the list stored in storage 308. The list may be configured to store a predetermined number of entries (e.g., 5 entries) so that when the list is full, the next content source that is added to the list overwrites the first or oldest content source stored in the list. Specifically, the list may have a predetermined size and may be configured to process entries in a queue manner (i.e., first in, first out) or a stack (i.e., last in, first out). Control circuitry 304 may receive an indication (e.g., from user input interface 310) of a selection of a last channel option. In response, control circuitry 304 may retrieve a next content source in the list stored in storage 308 and present content from the next content source. The next content source may be the last content source stored in the list, the first, or any other content source positioned in the list.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In some embodiments, control circuitry 304 may include voice or verbal input processing circuitry, such as a voice recognition engine 316. This voice or verbal input processing circuitry may include any interface that performs a voice recognition process. Control circuitry 304 may continuously or periodically access the microphone of user input interface 310 to detect the presence of voice input. Upon detecting voice input, control circuitry 304 may utilize voice recognition engine 316 (implemented in software or with dedicated circuitry) to identify words/phrases in the voice input. As used herein, voice input and verbal input are interchangeable terms and should be understood to have the same meaning. The voice recognition process may perform analog-to-digital conversion on the voice input and process the digital information to form a digital representation of the voice input (e.g., a digital sentence with the identified words/phrases). The voice recognition process may output to another component of control circuitry 304 the identified or extracted words or phrases for further processing. In some implementations, voice recognition engine 316 may be implemented to only respond to a voice received from a particular user or group of users. For example, in an environment where multiple users are present and from whom all of their voices are received by user input interface 310, control circuitry 304 may only respond to one or a selected few of the voices. This way, only one or the selected members of the users can be authorized to provide instructions using verbal commands to control circuitry 304.

In some embodiments, voice recognition engine 316 may include a voice command database. Voice command database may include a list of words/phrases and a corresponding set of instructions for each word/phrase. In response to receiving a verbal input from a user, voice recognition engine 316 may process the verbal input to extract words/phrases from the verbal input. Voice recognition engine 316 may cross-reference the identified words/phrases with the voice command database to retrieve the corresponding set of instructions for the identified words/phrases. For example, the voice command database may include an entry with the phrase "last channel" or any variation thereof. The phrase "last channel" may correspond to a set of instructions that instruct control circuitry 304 to return to one or more content sources included in a list of content sources from which content meeting the criterion was previously presented to the user (discussed below in FIGS. 5-7). Similarly, the voice command database may include an entry with the phrase "add this" or any variation thereof. The phrase "add this" may correspond to a set of instructions that instruct control circuitry 304 to add the content source currently being accessed to a list of content sources from which content meeting the criterion was previously presented to the user.

In some embodiments, control circuitry 304 may include a biometric response engine 318. Biometric response engine 318 may include circuitry that remotely or directly monitors a user's physiological and physical responses to content being presented. For example, biometric response engine 318 may include a heart pulse rate monitor, facial expression or position detection circuitry, eye movement and position detection circuitry, breathing pattern detection circuitry, user position and orientation detection circuitry, and/or any combination thereof. Control circuitry 304 may continuously or periodically access biometric response engine 318 to detect any changes (or interest) in physiological and/or physical attributes of a user at or during specified sections of a media content being presented. Upon detecting a change in the biometric response of the user (e.g., indicating change in interest), control circuitry 304 may utilize a biometric response database to identify a corresponding set of instructions to perform.

The biometric response database may include a mapping between a given biometric response and a set of instructions for processing by control circuitry 304. For example, a biometric response entry in the biometric response database may include a voice command keyword (e.g., playback, pause, record, rewind, fast-forward, change channel, channel up, channel down, access source 1, access source 2) and the corresponding instructions may be stored for the entry that instruct control circuitry 304 to perform the function identified by the keyword. For example, a biometric response database may include an entry that identifies interest of the user in the content being presented. When the biometric response database entry stops matching the biometric response, biometric response engine 318 may determine that the user is no longer interested in the content being presented. As a result, control circuitry 304 may determine that the criterion is no longer being met. Alternatively, if after a measured period of time that exceeds a threshold biometric response engine 318 indicates the user is still interested in the content being presented, control circuitry 304 may add the content source to the list of previously accessed content sources stored in storage 308.

In client-server-based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, microphone, touch screen, touchpad, stylus input, joystick, voice recognition interface, or other user input interfaces. User input interface 310 may include keys or displayed options that enable a user to instruct control circuitry 304 to access a last content source. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
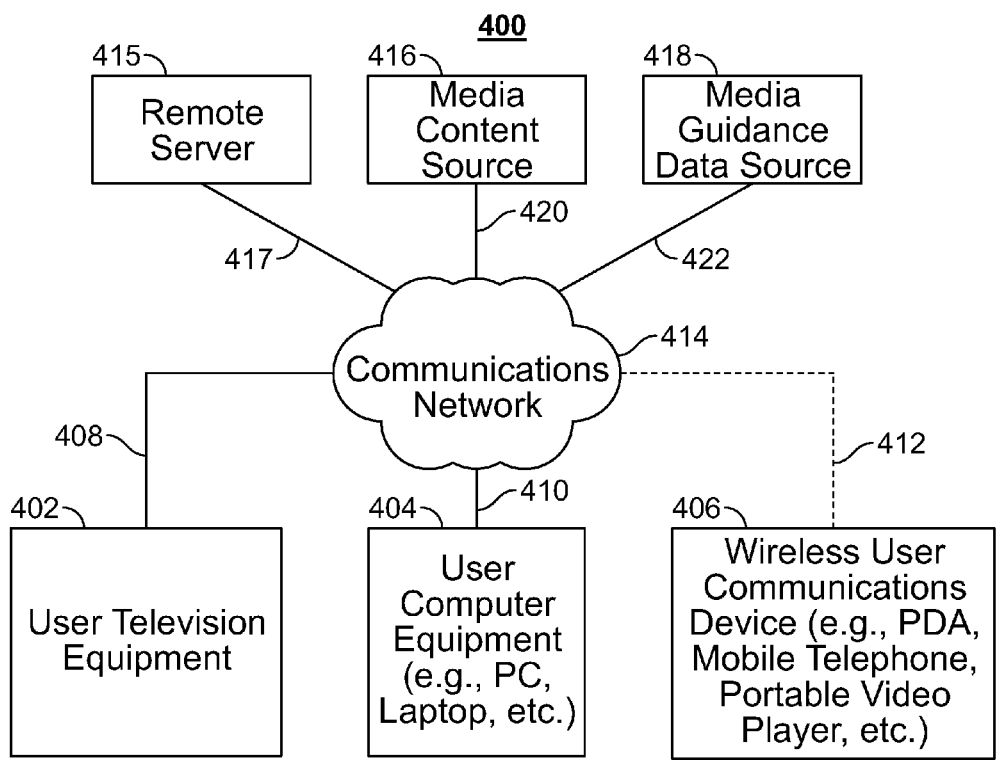
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Each user of the user equipment devices may be associated with different users in a crowd of users. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of remote server 415. When executed by control circuitry of remote server 415 (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites, blogs, news sites, or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, access to messages posted by users in a crowd, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, control circuitry 304 may track previously accessed content sources to enable a user to return to a previously accessed content source (e.g., by selecting a last channel option). Criterion or criteria set by a user or automatically may be compared with attributes or characteristics of a media asset currently being presented to the user from a currently accessed content source. In response to determining that the attributes or characteristics of the media asset matches the criterion set by the user or automatically, control circuitry 304 may start measuring a length of time that the content being presented on the content source continues to match the criterion. Control circuitry 304 may compare the measured length of time with a threshold (set by a user or predetermined). In response to determining that the measured length of time exceeds the threshold, control circuitry 304 may add the currently accessed content source to a list of previously accessed content sources from which content meeting the criterion was previously presented to the user.

In some embodiments, control circuitry 304 may receive a user input selecting an option to customize criterion/criteria and/or threshold for adding a content source to a list of previously accessed content sources. In response to receiving the user input, control circuitry 304 may navigate the user to screen 500 (FIG. 5) allowing the user to set up various options for the threshold and/or the attributes/characteristics of content being presented that is monitored to determine whether to add a content source from which the content is being received to the list.

Figure 5:
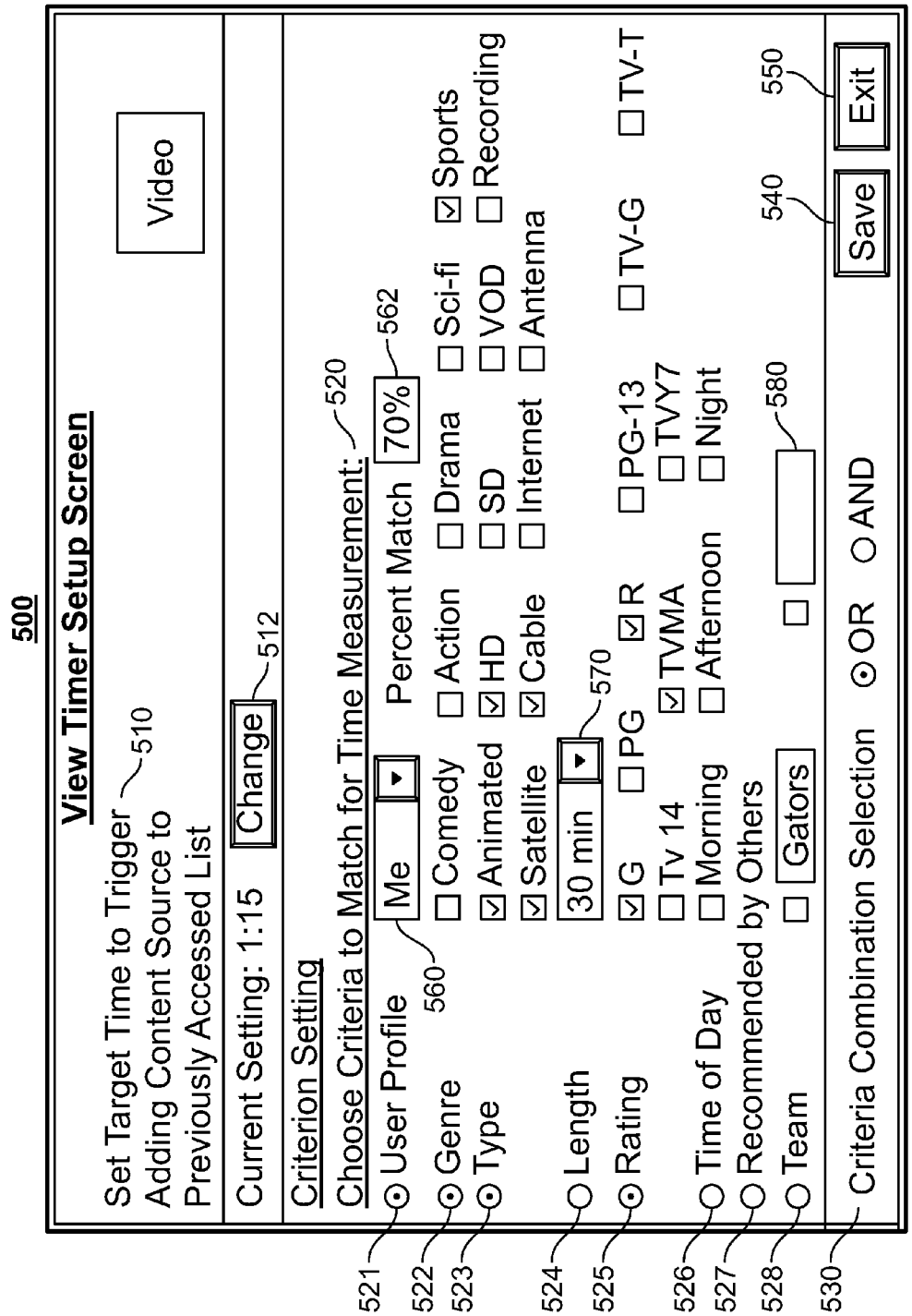
FIG. 5 shows an illustrative display of a view timer setup screen in accordance with an embodiment of the invention.

FIG. 5 shows an illustrative display of a view timer setup screen 500 in accordance with an embodiment of the invention. Screen 500 includes a threshold setup region 510 and a criterion/criteria setup region 520. Region 510 may include options to modify the current value for the timer threshold which may be used to determine when to add a given content source to a list of previously accessed content sources. Region 520 may include options to enable a user to select which attributes/characteristics of content being presented to the user has to match the criterion/criteria in order to initiate measurement of time that the content having the attributes/characteristics is being presented. In particular, the measurement of time during which attributes/characteristics of content match criteria/criterion (previously selected) may be conditioned on whether the content currently being shown is associated with attributes/characteristics that match the criteria/criterion. Specifically, control circuitry 304 may retrieve attributes/characteristics of content being accessed and compare the retrieved attributes/characteristics with the criterion/criteria set in region 520 to determine whether to start measuring time which the attributes/characteristics of the content being presented matches the criterion. When the attributes/characteristics of the content being presented from the content source stop matching the criterion/criteria set in region 520, control circuitry 304 pauses or stops the current time measurement and resumes measuring time when the attributes/characteristics of the content being presented from the content source starts matching the criterion/criteria again.

Region 510 may include a display that indicates the current setting for the threshold value. Option 512 may be provided to enable the user to modify the value for the threshold. In response to receiving a user selection of option 512, control circuitry 304 may request input from the user with a new value for the threshold. Control circuitry 304 may receive the value for the threshold from the user and replace the previously stored value with the new value. The user may specify any range of values for the threshold. Control circuitry 304 may use the threshold specified in region 510 to determine when to add a given content source to a list of previously accessed content sources. In some implementations, control circuitry 304 may recommend a new threshold value for the user in response to receiving a selection of option 512. Specifically, control circuitry 304 may determine the average viewing time of content on a given channel for the user. Control circuitry 304 may recommend a threshold value that represents the average viewing time and the user may select the recommended value to replace the current threshold value.

In some embodiments, an option to make the threshold dynamic may be provided (not shown). Setting the threshold to be dynamic may cause the threshold to increase or decrease based on how many criteria a given content being presented matches. For example, content that matches a greater number of criteria may cause a shorter threshold to be used and consequently the content source from which the content is being accessed may be added to the list of previously accessed content sources more quickly and is more likely to be added. Alternatively, content that matches a lower number of criteria than another may cause a longer threshold to be used and consequently the content source from which the content is being accessed may be added to the list of previously accessed content sources after a longer period of time and is less likely to be added. Specifically, in response to setting the dynamic threshold option, control circuitry 304 may determine how many of the criteria set in region 520 match a piece of content being presented. For each number of criteria that the content being presented matches, control circuitry 304 may decrease the threshold amount by a predetermined number (e.g., 5 seconds). For example, the threshold may be initially set to one minute and 15 seconds. The user may be presented with a content that matches 3 out of 10 criteria. Accordingly, the threshold may be decreased to 1 minute and consequently control circuitry 304 may add the content source of the content being presented to the list if the content continues to match the 3 out of 10 criterion for a period of 1 minute.

Region 520 may include various options/settings to change and control what criteria are analyzed and monitored from the content being presented to trigger the measurement of viewing time. Specifically, control circuitry 304 may determine whether attributes/characteristics of the content being presented from a content source matches the criteria specified and selected in region 520. In response to determining that the content being presented has attributes/characteristics that match the criteria selected in region 520, control circuitry 304 may initiate or resume measuring how long the content is being presented.

Region 520 may include a user profile option 521, a genre option 522, a type option 523, a length option 524, a rating option 525, a time of day option 526, a Recommended-by-others option 527 and a team option 528. Other options not shown in region 520 may be provided without departing from the teachings of this invention but are not being discussed for the sake of brevity. Options shown in region 520 are illustrated as radio buttons to indicate that any one or all of the options in region 520 may be selected. The criteria defined by those options in region 520 with a radio button selected are used by control circuitry 304 to match against attributes/characteristics of content being presented to the user. The criteria defined by those options in region 520 with a radio button not selected are ignored or not used by control circuitry 304 to match against attributes/characteristics of content being presented to the user.

User profile option 521 may allow a user to specify one or more user profiles. In response to selecting user profile option 521, control circuitry 304 may present a user profile selection menu 560. User profile selection menu 520 may list all of the profiles stored in storage 308, profiles retrieved from a social network, the cloud, or any other profile. The user may select any one or all of the profiles listed in menu 520. As part of the process of determining whether the attributes/characteristics of the content being presented matches the criteria specified in region 520, control circuitry 304 may determine whether attributes of the content meet or exceed preferences stored in the selected profile(s) when option 521 is selected.

In some implementations, a percent match selection option 562 may be provided. The user may input a percentage in option 562 to indicate a threshold value for which attributes/characteristics of content being presented have to exceed in matching preferences stored in the profiles selected in menu 560. For example, control circuitry 304 may compute a Euclidian distance between attributes/characteristics of content being presented and preferences stored in the profile(s) selected in menu 560. Control circuitry 304 may derive a percentage match from the computed Euclidian distance and compare the percentage to the percentage specified in option 562. In response to determining that the percentage match exceeds the percentage specified in option 562, control circuitry 304 may determine that the attributes/characteristics of the content being presented matches the criteria of the user profile option 521. When no value is specified in option 562, control circuitry 304 may determine whether an average number of attributes/characteristics of the content being presented matches the preferences specified in the profile(s) selected in menu 560.

Genre option 522 may allow a user to specify a genre for use in comparing against attributes/characteristics of content being presented to the user. In response to selecting genre option 522, control circuitry 304 may present a list of various genres (e.g., comedy, action, drama, sci-fi, sports, etc.), categories and/or combination categories. The user may select any one or all of the genres, categories and/or combination categories listed for option 522. As part of the process of determining whether the attributes/characteristics of the content being presented matches the criteria specified in region 520, control circuitry 304 may determine whether a genre, category, and/or combination category of the content being presented meets the selected genres, categories and/or combination categories for option 522 when option 522 is selected.

Type option 523 may allow a user to specify a type for use in comparing against attributes/characteristics of content being presented to the user. In response to selecting type option 523, control circuitry 304 may present a list of content types (e.g., animated, high-definition, standard definition, on-demand delivery, recording, satellite content, cable content, internet content, antenna content, etc.). The user may select any one or all of the types listed for option 523. As part of the process of determining whether the attributes/characteristics of the content being presented matches the criteria specified in region 520, control circuitry 304 may determine whether a type of the content being presented meets the selected type for option 523 when option 523 is selected.

Length option 524 may allow a user to specify a duration for use in comparing against attributes/characteristics of content being presented to the user. In response to selecting length option 524, control circuitry 304 may present a drop-down menu 570 with a list of durations for content (e.g., 30 minutes, 1 hour, 2 hours, user specified duration, etc.). The user may select any one or all of the durations listed in menu 570. As part of the process of determining whether the attributes/characteristics of the content being presented match the criteria specified in region 520, control circuitry 304 may determine whether duration of the content being presented meets the duration specified in menu 570 when option 524 is selected.

Rating option 525 may allow a user to specify a rating for use in comparing against attributes/characteristics of content being presented to the user. In response to selecting rating option 525, control circuitry 304 may present a list of ratings (e.g., G, PG, R, PG-13, TV-G, TV-T, TV14, TVMA, TVY7, etc.). The user may select any one or all of the ratings listed for option 525. As part of the process of determining whether the attributes/characteristics of the content being presented match the criteria specified in region 520, control circuitry 304 may determine whether a rating assigned to the content being presented meets or exceeds the selected rating for option 525 when option 525 is selected.

Time of day option 526 may allow a user to specify a time of day for use in comparing against attributes/characteristics of content being presented to the user. In response to selecting time of day option 526, control circuitry 304 may present a list of times of day (e.g., morning, afternoon, night, user specified time range, etc.). The user may select any one or all of the times of day listed for option 526. As part of the process of determining whether the attributes/characteristics of the content being presented match the criteria specified in region 520, control circuitry 304 may determine whether a time of day in which the content is being presented meets the selected time(s) of day for option 526 when option 526 is selected.

Recommended-by-others option 527 may allow a user to select whether to identify content Recommended-by-others to compare against attributes/characteristics of content being presented to the user. As part of the process of determining whether the attributes/characteristics of the content being presented match the criteria specified in region 520, control circuitry 304 may determine whether the content being presented meets was Recommended-by-others when option 527 is selected. For example, control circuitry 304 may query a social network associated with the user to retrieve a list of recommendations made by friends of the user on the social network. Control circuitry 304 may determine whether the content being presented matches any one of the recommendations made by friends to determine whether the content being presented meets was Recommended-by-others when option 527 is selected.

Team option 528 may allow a user to specify a team for use in comparing against attributes/characteristics of content being presented to the user. In response to selecting team option 528, control circuitry 304 may present a list of contestants, teams or athletes and/or may allow the user to specify a specific contestant, team or athlete using text entry box 580. The user may select any one or all of the teams listed for option 528. As part of the process of determining whether the attributes/characteristics of the content being presented match the criteria specified in region 520, control circuitry 304 may determine whether a contestant, team or athlete associated with or playing in the content being presented meets the selected contestant, team or athlete for option 528 when option 528 is selected. The contestant, team or athlete may be associated with the content being presented if the contestant, team or athlete is playing in the content or is a rival of another team playing in the content being presented.

Region 520 may include a commercial option (not shown). In response to selecting the commercial option, control circuitry 304 may, as part of the process of determining whether the attributes/characteristics of the content being presented match the criteria specified in region 520, determine whether the content is in a commercial break (e.g., a portion of the program that is an advertisement and not a plot portion). Specifically, content presented to the user may be a program that has multiple plot portions with commercial breaks or interruptions between the plot portions. When the commercial option is selected, control circuitry 304 may determine whether the content being presented is in the plot portion or is in a commercial break. If the content being presented is in a commercial break and the commercial option is selected, control circuitry 304 may determine that the content does not match criteria set in region 520. Alternatively, if the content being presented is in a commercial break and the commercial option is not selected, control circuitry 304 may determine that the content does match criteria set in region 520.

Region 520 may include a biometric response condition option (not shown). In response to selecting the biometric response condition option, control circuitry 304 may, as part of the process of determining whether the attributes/characteristics of the content being presented match the criteria specified in region 520, determine biometric response of the user (e.g., a heart rate, attention, face direction, breathing rate, focus, eye gazing, user's presence within range of the screen, etc.) to determine whether the user is interested or is paying attention to the content being presented. If the biometric response of the user indicates that the user is interested in or is paying attention to the content being presented and the biometric response condition option is selected, control circuitry 304 may determine that the content does match criteria set in region 520. Alternatively, if the biometric response of the user indicates that the user is not interested in or is not paying attention to the content being presented and the biometric response condition option is selected, control circuitry 304 may determine that the content does not match criteria set in region 520.

Region 520 may also include a criteria combination selection option 530. Option 530 may allow a user to specify how options 521-528 are logically combined in comparing against attributes/characteristics of content being presented to the user. Specifically, option 530 may include a logical OR option and a logical AND option. In response to receiving a user selection of the logical OR option in option 530, control circuitry 304 may determine that the content being presented to the user matches the criteria/criterion set in region 520 if the attributes/characteristics of the content match any one of selected options 521-528 in region 520. For example, control circuitry 304 may determine that the content being presented to the user matches the criteria set in region 520 if the genre of the content matches the genre selected for option 522 even though the content being presented does not match a rating specified for option 525 (e.g., the content may be rated R and the selected rating for option 525 may be G or lower).

In response to receiving a user selection of the logical AND option in option 530, control circuitry 304 may determine that the content being presented to the user matches the criteria set in region 520 if the attributes/characteristics of the content match every one of selected options 521-528 in region 520. For example, control circuitry 304 may determine that the content being presented to the user matches the criteria set in region 520 if the genre of the content matches the genre selected for option 522 and the content being presented matches a rating specified for option 525. Similarly, control circuitry 304 may determine that the content being presented to the user fails to match the criteria set in region 520 if the genre of the content matches the genre selected for option 522 and the content being presented does not match a rating specified for option 525.

Control circuitry 304 may first determine the outcome of every option 521-528 selected for region 520 when compared with the content being presented to the user. The outcome of every option 521-528 may be logically TRUE when an attribute of the content being presented matches the criterion set for a given option 521-528. For example, the outcome may be TRUE when time of day option 526 is selected to be morning and the time at which the content being presented to the user is between 8 AM-11 AM. The outcome of every option 521-528 may be logically FALSE when an attribute of the content being presented fails to match the criterion set for a given option 521-528. For example, the outcome may be FALSE when team option 528 is selected and specifies the team "Gators" and the teams playing in the content being presented to the user is "Seminoles" and "Hurricanes."

After determining the outcome of every option 521-528 that is selected, control circuitry 304 may determine whether option 530 is selected to be a logical OR or a logical AND. When option 530 specifies a logical OR was selected, control circuitry 304 may determine whether the outcome of any selected option 521-528 was TRUE. If the outcome of any selected option 521-528 was TRUE, control circuitry 304 may determine that the content being presented to the user matches criteria set in region 520. Consequently, control circuitry 304 may start or continue to measure an amount of time that the content is presented to the user. When option 530 specifies a logical AND was selected, control circuitry 304 may determine whether the outcome of every selected option 521-528 was TRUE. If the outcome of any selected option 521-528 was FALSE, control circuitry 304 may determine that the content being presented to the user does not match criteria set in region 520. Consequently, control circuitry 304 may pause or not measure an amount of time that the content is presented to the user.

In some embodiments, control circuitry 304 may sequentially determine whether an outcome of a given option 521-528 when compared with the content being presented to the user meets the selected logical operation specified in option 530. This is to avoid having to first compute and determine whether the content being presented to the user matches all of the selected options and then determining whether the logical operation is met. Specifically, control circuitry 304 may first determine whether option 530 is selected to be a logical OR or a logical AND. After determining whether option 530 is selected to be a logical OR or a logical AND operation, control circuitry 304 may determine an outcome of a first of options 521-528 selected for region 520 when compared with the content being presented to the user. If option 530 is selected to be a logical OR and in response to determining that the outcome of the first of selected options 521-528 is FALSE, control circuitry 304 may next determine an outcome of a second of options 521-528. If option 530 is selected to be a logical OR and in response to determining that the outcome of the first of selected options 521-528 is TRUE, control circuitry 304 may stop testing outcomes of the remaining selected options 521-528 and may determine that the content being presented meets criteria/criterion set in region 520. If option 530 is selected to be a logical AND and in response to determining that the outcome of the first of selected options 521-528 is FALSE, control circuitry 304 may stop testing outcomes of the remaining selected options 521-528 and may determine that the content being presented fails to meet criteria/criterion set in region 520. If option 530 is selected to be a logical AND and in response to determining that the outcome of the first of selected options 521-528 is TRUE, control circuitry 304 may next determine an outcome of a second of options 521-528 until outcomes of all of the selected options 521-528 are determined to be TRUE.

Control circuitry 304 may continue to make the determinations of whether the content being presented matches the selected options 521-528 until all of the selected options are tested or until control circuitry 304 determines that the logical operation is TRUE. Specifically, in the case of option 530 being selected to be an OR operation, control circuitry 304 may continue to make the determinations of whether the content being presented matches the selected options 521-528 until all of the selected options are tested or until control circuitry 304 determines that the logical operation is TRUE. In the case of option 530 being selected to be an AND operation, control circuitry 304 may continue to make the determinations of whether the content being presented matches the selected options 521-528 until all of the selected options are tested and determined to be TRUE or until control circuitry 304 determines that the logical operation is FALSE (i.e., any one of the outcomes of selected options 521-528 is determined to be FALSE).

A save option 540 may be included in display 500. In response to receiving a user selection of save option 540, control circuitry 304 may store all of the options selected in regions 510 and 520 and return the user to the previous screen (e.g., the content being presented previously). An exit option 550 may be included in display 500. In response to receiving a user selection of exit option 550, control circuitry 304 may discard all of the options selected in regions 510 and 520 and return the user to the previous screen (e.g., the content being presented previously).

In some embodiments, when the user accesses a new content source (e.g., when the user changes channels), control circuitry 304 may determine whether the content presented by the content source matches a criterion or criteria. In response to determining that the content being presented matches the criterion or criteria, control circuitry 304 may start measuring time (e.g., may start a timer) while the content being presented matches the criterion or criteria. Control circuitry 304 may continuously or periodically determine whether the content matches the criterion or criteria and when the content being presented stops matching the criterion or criteria (e.g., the content enters a commercial interruption), control circuitry 304 may pause measuring time (e.g., may store the current value of a timer). When the content being presented resumes matching the criterion or criteria (e.g., the content enters a commercial interruption), control circuitry 304 may resume measuring time (e.g., may retrieve the value of a timer stored in memory and continue the timer).

In response to determining that the measured time meets or exceeds a threshold, control circuitry 304 may add the content source from which the content is presented to the user to a list of previously accessed content sources. When the user requests access to a previous content source, control circuitry 304 may retrieve one of the content sources from the list of previously accessed content sources and present content to the user from the retrieved content source.

Figure 6:
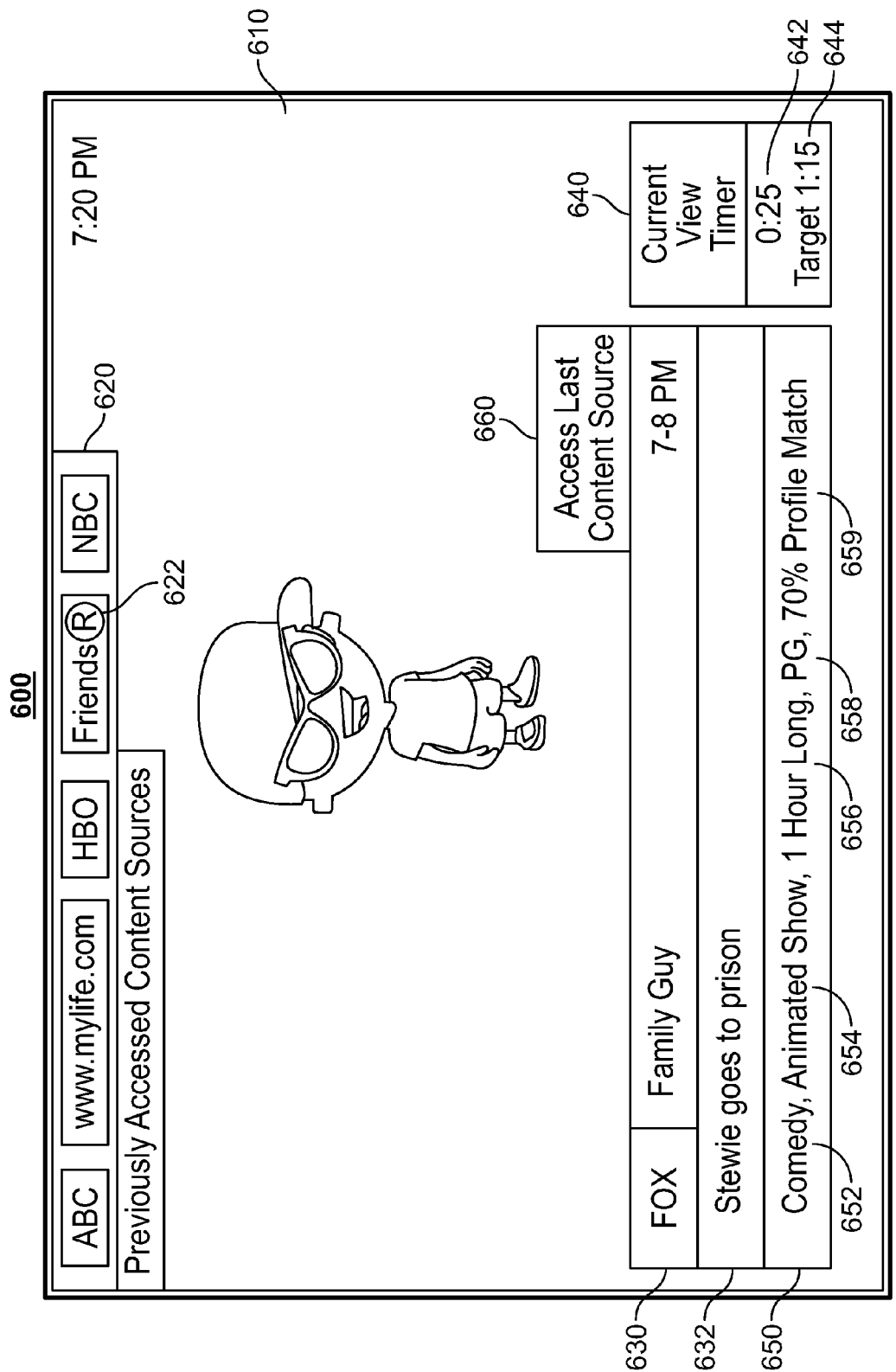
FIG. 6 shows an illustrative display screen of a list of content sources from which content meeting criterion was previously presented to the user in accordance with an embodiment of the invention.

FIG. 6 shows an illustrative display screen 600 of a list of content sources from which content meeting criterion was previously presented to the user in accordance with an embodiment of the invention. Screen 600 may include content 610, a list of previously accessed content sources region 620, a content information overlay 630, and a timer region 640.

In some embodiments, a user may select a content source (e.g., a television channel) and control circuitry 304 may access the selected content source (e.g., tune to the selected television channel). For example, control circuitry 304 may receive a user selection of a program listing from grid 102 and in response may tune to the television channel corresponding to the selected listing. Control circuitry 304 may display content received from the content source as video 610. For example, control circuitry 304 may display as video 610 the video of the program received from the television channel.

Control circuitry 304 may automatically, or in response to a user request (e.g., a selection of an INFO key), display content information overlay 630. Content information overlay 630 may include information about content 610 being presented on the selected content source. For example, content information overlay 630 may include a content source identifier (e.g., a channel name or number), a title of content 610, a scheduled transmission time interval for content 610, a detailed description region 632 and a content attribute region 650. Detailed description region 632 may include a brief description about content 610 being presented. Detailed description region 632 may also include a list of other content related to content 610 being presented.

To populate the information for overlay 630, control circuitry 304 may retrieve from storage 308 a data structure associated with the content being presented. Specifically, control circuitry 304 may generate an SQL query that includes the current time and the content source being accessed. Control circuitry 304 may transmit the SQL query to a local or remote database. The local or remote database may identify a data structure associated with content provided on the content source at the specified time and may return back to control circuitry 304 the data structure. The data structure may include multiple fields. For example, the data structure may include a title field that identifies the title of the accessed content, a related content field identifying related content, a scheduled transmission time field identifying the period of time during which the content is available from the content source, detailed description field, and content attributes fields which specify different attributes associated with the content. Control circuitry 304 may retrieve the data structure for content 610 before, during or after accessing the content source from which content 610 is being received and presented.

Content attribute region 650 may display attributes received in the data structure for content 610. For example, content attribute region 650 may include a genre field 652 (e.g., comedy), a type field 654 (e.g., animated), a length or duration field 656 (e.g., 1 hour long), a rating field 658 (e.g., PG) and a profile match field 659 (e.g., illustrating how close the attributes of content 610 match preferences in a user profile). Other fields may also be included in region 650. In some implementations, region 650 may list all the fields that match or that do not match those criteria selected in region 520 (FIG. 5). For example, if the user selected user profile option 521 and genre option 522, region 650 may only display attributes of content 610 corresponding to the selected options (e.g., comedy and 70% profile match). In some implementations, region 650 may list all of the attributes of content 610 and may include visual indicators with each attribute that identify whether a given attribute was selected as criteria in region 520 and whether it matches or does not match the selected criteria.

In response to accessing the selected content source, control circuitry 304 may initialize a view timer (e.g., set a counter to zero). Control circuitry 304 may determine whether attributes of content 610 (e.g., attributes in region 650) match criteria selected in region 520 (FIG. 5) or some other predefined default criteria (e.g., whether the content is in a commercial break or not). The above and below discussions pertain to an implementation where attributes/characteristics of content being presented are compared with criteria/criterion set in region 520. However, the teachings of this disclosure apply similarly to embodiments where criteria/criterion are not selected in region 520 but are set to default value(s). For example, the system may be set up to check whether content being presented is of a certain genre or type and condition whether time should continue to be measured or paused based on this check.

In response to determining that the attributes of content 610 match the criteria selected in region 520, control circuitry 304 may start the view timer. Control circuitry 304 may periodically or continuously monitor the attributes of content 610. For example, control circuitry 304 may analyze closed-caption data or may re-transmit and request updated data structures for the content being presented on the selected content source from a local or remote database. While attributes of content 610 being presented continue to match the criteria selected in region 520, the view timer may continue to count or measure time. However, upon determining that the attributes of content 610 being presented changed and no longer match the criteria selected in region 520, control circuitry 304 may pause (e.g., stop) the view timer. While the view timer is paused, control circuitry 304 may periodically or continuously monitor the attributes of content 610 in a similar manner as discussed above to determine whether attributes of content 610 changed to again match the criteria selected in region 520. When the attributes of content 610 change to again match the criteria selected in region 520, control circuitry 304 may resume the view timer (e.g., may resume measuring time from the last point at which it was stopped).

Timer region 640 may present the value of the timer. Specifically, control circuitry 304 may retrieve the value of the timer as the timer is measuring time and present the retrieved value in region 640 as timer value 642. By displaying value 730, the user may be able to determine when the content being presented matches the criteria set in region 520. For example, if value 642 is being incremented continuously (every second), the user may determine that the content being presented matches the criteria. If value 642 is not being incremented continuously, the user may determine that the content being presented does not match the criteria and that the timer has been stopped or paused. Region 640 may include a target value 644 that represents the threshold the timer has to reach before control circuitry 304 adds the content source being accessed to a list of previously accessed content sources. Value 644 may be predetermined, set to a default value, or set in region 510 (FIG. 5) as discussed above.

In some embodiments, control circuitry 304 may determine whether the currently accessed content source is already included in the list of previously accessed content sources. If the currently accessed content source is already in the list, control circuitry 304 may not initialize the view timer and may maintain the content source in the list. Alternatively, if the currently accessed content source is already in the list, control circuitry 304 may initialize the view timer and determine whether content being presented on the content source matches criteria set in region 520. While the content being presented matches the criteria, the view timer may measure time and upon reaching the threshold, control circuitry 304 may keep the content source in the list. However, if the current content source changes (e.g., a channel is changed) before the content presented by the current content source is determined to match the criteria set in region 520 for the threshold amount of time, control circuitry 304 may remove the current content source from the list of previously accessed content sources.

For example, the ABC television channel may be included in the list of previously accessed content sources. When the user changes channels from the channel FOX to ABC (either by direct channel selection or in response to selecting option 660), control circuitry 304 may determine that ABC is included in the list and may therefore not initialize the view timer to cause the content source to be added again. Alternatively, when the user changes channels from the channel FOX to ABC (either by direct channel selection or in response to selecting option 660), control circuitry 304 may make a new determination as to whether to keep the ABC channel content source in the list or delete the content source. Control circuitry 304 may make this determination in the same manner as discussed above. Namely, control circuitry 304 may determine whether content presented by the ABC channel matches criteria set in region 520 for a threshold amount of time (e.g., 2 minutes). If the content presented by ABC matches the criteria for the threshold amount of time, control circuitry 304 may keep the content source in the list of previously accessed content sources. However, if the user changes channels to access NBC content source before the content presented by ABC matches the criteria for the threshold amount of time, control circuitry 304 may remove the ABC channel content source from the list of previously accessed content sources.

For example, a user may select the FOX television channel as a content source. Control circuitry 304 may tune to the FOX television channel and display video of the show ""Family Guy"" currently being received on that channel. Control circuitry 304 upon tuning to the selected channel may initialize the view counter (e.g., set the timer to the value "0"). Control circuitry 304 may determine that ""Family Guy"" is associated with a genre attribute, comedy, and is associated with a show type, animated. Control circuitry 304 may determine that criteria selected in region 520 are: genre option 522 with a setting of comedy and type option 523 with a setting of VOD and criteria combination selection option 530 is selected to be OR. Accordingly, control circuitry 304 may determine that the genre attribute of the show ""Family Guy"" matches the criteria set in region 520 but that the other attributes of the show do not match the criteria set in region 520. However, because the combination selection option 530 was selected to be OR logic, the logical combination of the outcomes of the comparison between the criteria selected in region 520 and the attributes of the show is a logical TRUE (i.e., only one of the show attributes needs to match the criteria selected in region 520) and thus control circuitry 304 may determine that the attributes of the show match the criteria set in region 520. In response to determining that the attributes of the show match, control circuitry 304 may instruct the view timer to start measuring time (e.g., count time up or increment periodically, such as every second).

While the show "Family Guy" is being presented on the selected television channel FOX, control circuitry 304 may monitor the attributes of the show. Control circuitry 304 may determine that after 20 seconds of presenting the show, the only attribute that was determined to match (e.g., genre being comedy) no longer matches. Specifically, the show may run into a plot portion that is determined to fall into the horror genre and not comedy. Accordingly, control circuitry 304 may determine that although the same content is being presented (e.g., the show "Family Guy"), the content now includes attributes that no longer match the criteria set in region 520 (FIG. 5). In response, control circuitry 304 may instruct the view timer to stop measuring time (e.g., pause time at 20 seconds) and continue presenting video of the show to the user.

In some embodiments, while the show "Family Guy" is being presented on the selected television channel FOX, control circuitry 304 may monitor a biometric response of the user. The biometric response may be monitored and considered in a similar manner as one of the criteria specified in region 520 if selected by the user in region 520. For example, control circuitry 304 may determine using biometric response engine 318 whether the user is paying attention to the content being presented or is interested in the content being presented (e.g., increased heart rate or change in breathing pattern). Specifically, biometric response engine 318 may determine if the eyes or face of the user is facing the screen on which the content is being presented. In response to determining the eyes or face is not facing the screen, biometric response engine 318 may indicate to control circuitry 304 that the user is not paying attention or is not interested in the content being presented. In response, control circuitry 304 may instruct the view timer to stop measuring time (e.g., pause time at 20 seconds) and continue presenting video of the show to the user. Control circuitry 304 may instruct the view timer to resume measuring time when biometric response engine 318 indicates to control circuitry 304 that the user is paying attention again or is now interested in the content being presented.

Control circuitry 304 may monitor the attributes of the show while the timer is paused, and after another 2 minutes of the timer being paused at 20 seconds, control circuitry 304 may determine that the show includes attributes that match the attributes set in region 520 (e.g., the show is no longer in a horror portion of the plot and returned to a comedy portion). Accordingly, control circuitry 304 may instruct the view timer to resume measuring time from the previous paused portion. In this scenario, although the user has watched or been presented with content 610 on the selected content source for 2 minutes and 20 seconds, only 20 seconds are measured by the view timer reflecting only the portions of time that the content being presented included attributes that match criteria set in region 520.

In some implementations, a user may request access to a content source, such as a website (e.g., HULU.com) or other Internet source. Control circuitry 304 may access the website and allow the user to select a show (e.g., by title) for presentation (e.g., VOD delivery) from the website (e.g., select a show from a set of show listings presented in a similar manner as grid 102). Control circuitry 304 upon accessing to the selected show from the website or Internet may initialize the view counter. Control circuitry 304 may determine that selected show currently is in a plot portion, is associated with a rating attribute, R, and is associated with a show type, Internet delivered. Control circuitry 304 may determine that criteria selected in region 520 are: a commercial detection option, rating option 522 with a setting of R and type option 523 with a setting of VOD, and criteria combination selection option 530 is set to AND. Accordingly, control circuitry 304 may determine that because the show is currently presenting a plot portion (not a commercial), the show's attribute matches the commercial detection option, the genre attributes of the selected show match the criteria set in region 520, and that the type of show being Internet (i.e., VOD) matches the criteria set in region 520. Because the combination selection option 530 was set to AND logic, the logical combination of the outcomes of the comparison between the criteria selected in region 520 and the attributes of the show is a logical TRUE and thus control circuitry 304 may determine that the attributes of the show match the criteria set in region 520. In response to determining that the attributes of the show match, control circuitry 304 may instruct the view timer to start measuring time.

While video of the selected show from the website or Internet content source is being presented, control circuitry 304 may monitor the attributes of the show. Control circuitry 304 may determine that after 40 seconds of presenting the show, the show now is in a commercial break and that therefore the segment attribute of the show (i.e., commercial portion or plot portion) no longer matches the commercial detection option. Accordingly, control circuitry 304 may determine that the content now includes attributes that no longer match the criteria set in region 520 (FIG. 5). In response, control circuitry 304 may instruct the view timer to stop measuring time (e.g., pause time at 40 seconds) and continue presenting the show in the commercial break to the user.

In some embodiments, while video of the selected show from the website or Internet content source is being presented, control circuitry 304 may monitor a biometric response of the user. The biometric response may be monitored and considered in a similar manner as one of the criteria specified in region 520 if selected by the user in region 520. For example, control circuitry 304 may determine using biometric response engine 318 whether the user is paying attention to the content being presented or is interested in the content being presented. Specifically, biometric response engine 318 may determine if the eyes or face of the user is facing the screen on which the content is being presented or whether a biometric attribute of the user indicates interest (e.g., increased heart rate or change in breathing pattern). In response to determining the eyes or face is not facing the screen, biometric response engine 318 may indicate to control circuitry 304 that the user is not paying attention or is not interested in the content being presented. In response, control circuitry 304 may instruct the view timer to stop measuring time (e.g., pause time at 40 seconds) and continue presenting the show to the user. Control circuitry 304 may instruct the view timer to resume measuring time when biometric response engine 318 indicates to control circuitry 304 that the user is paying attention again or is now interested in the content being presented.

Control circuitry 304 may monitor the attributes of the show while the timer is paused, and after another 1 minute of the timer being paused at 40 seconds, control circuitry 304 may determine that the show includes attributes that match the attributes set in region 520 (e.g., the show is no longer in a commercial break and the plot portion is being presented). Accordingly, control circuitry 304 may instruct the view timer to resume measuring time from the previous paused portion.

Figure 7:
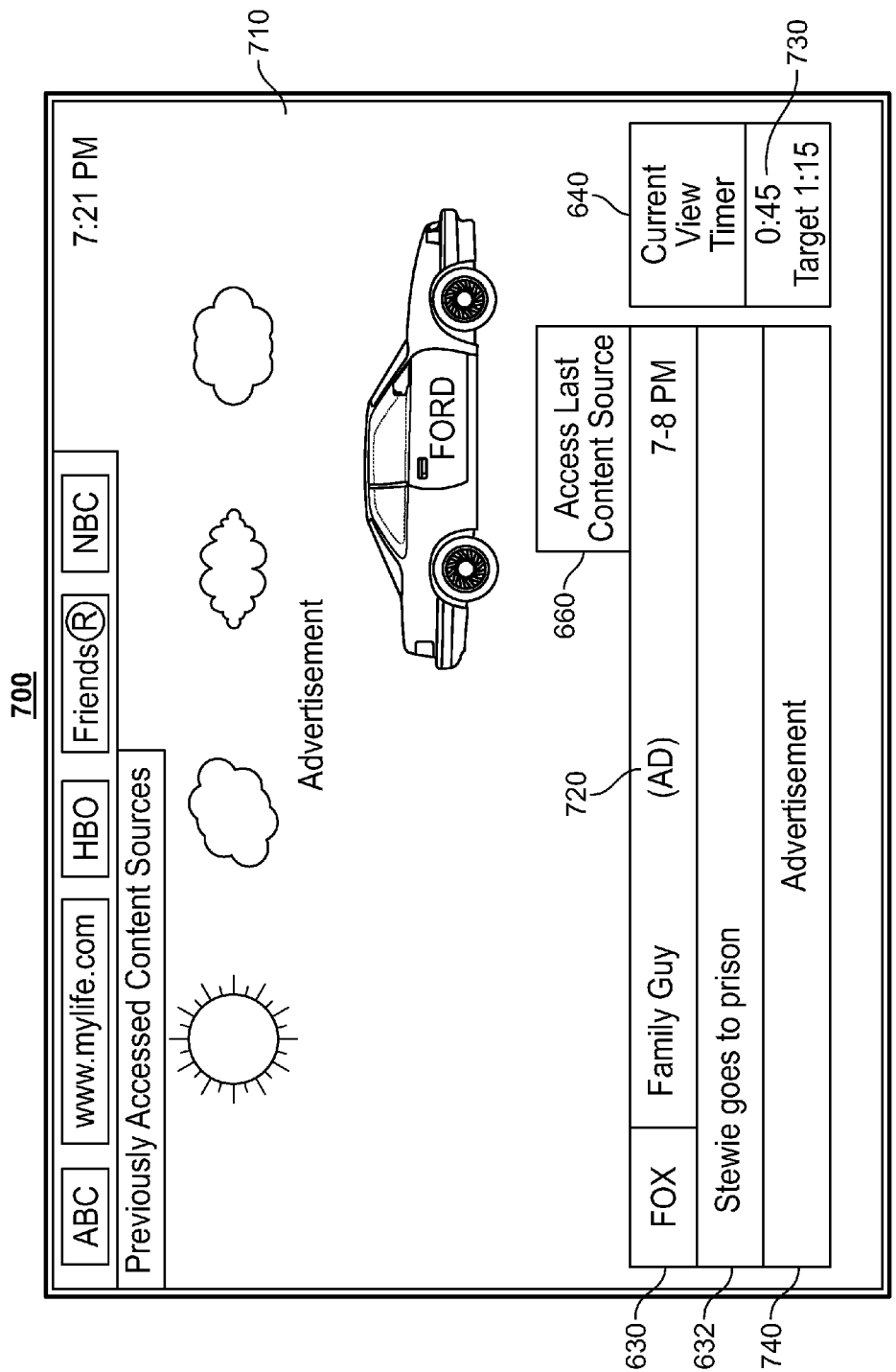
FIG. 7 shows an illustrative display screen of a current view timer being used to modify a list of content sources from which content was previously presented in accordance with an embodiment of the invention.

FIG. 7 shows an illustrative display screen 700 of a current view timer being used to modify a list of content sources from which content was previously presented in accordance with an embodiment of the invention. Specifically, content 610 (FIG. 6) may have a first set of attributes shown in region 650 and after a certain amount of time of being presented may change attributes to attributes shown in region 740 (FIG. 7). As shown, the same content is being presented to the user between screens 600 and 700 but the attributes may have changed. In particular, whereas content 610 may have been in a plot portion being presented which matched the criteria set in region 520, content 710 may be a commercial and thus not match criteria set in region 520. In some implementations, when control circuitry 304 pauses the view timer (e.g., because one or more content attributes do not match the criteria set in region 520), control circuitry 304 may visually indicate which attribute(s) caused the view timer to stop. Control circuitry 304 may display the visual indication in region 740. In some implementations, control circuitry 304 may display an indicator 720 informing the user that the view timer has been paused or stopped due to one or more attributes of the content no longer matching criteria set in region 520 (FIG. 5). The value 730 of the view timer may not be incremented during the time which the attributes of the content being presented do not match the criteria set in region 520.

In some embodiments, control circuitry 304 may retrieve a threshold set in region 510 (FIG. 5). Specifically, control circuitry 304 may retrieve from storage 308 a value assigned to the threshold for determining when to add a given content source to the list of previously accessed content sources. Control circuitry 304 may store the value of the threshold in the view timer. The view timer may continuously or periodically compare the current view timer value (for a given content source) with the stored threshold. When the view timer determines that the current view timer value exceeds the threshold, the view timer may generate an interrupt in control circuitry 304. For example, the view timer may transmit a communication or signal to control circuitry 304 indicating that the view time for the content source from which the content is being presented has exceeded the threshold value. In response to the interrupt, communication or signal, control circuitry 304 may add the content source being accessed to a stored list of previously accessed content sources. The content source may be added to the end, middle or beginning of the list.

In some embodiments, the view timer may continue measuring time in which content from the content source being presented has attributes/characteristics that match criteria/criterion set in region 520 even after the threshold is exceeded. This value may indicate a total amount of time the user was presented with content from a particular content source that had attributes matching criteria set in region 520. In some implementations, control circuitry 304 may store with the corresponding content source in the list the value of the view timer identifying the total amount of time the user was presented content from the content source. This value may be used to sort the list according to amount of time spent by the user watching or accessing content from each content source in the list. In some embodiments, the content sources in the list may be presented in response to selection of a last content source option in the ordered sequence (e.g., in the sequence corresponding to the amount of time indicated by the view timer—from the content source having the greatest value to the content source with the lowest value or vice versa).

List 620 may be included in screen 600. List 620 may include representations of content sources which are in the list of previously accessed content sources. The representations may be icons, videos, graphics or any other visual identifier of a given content source. For example, one representation may be video or content currently being presented on the corresponding content source, another representation may be a channel name or content source name of the given content source, another representation may be a graphic unique to a given content source (e.g., a video cassette representing a digital or analog storage device, DVR). The representations may all be of a similar kind or may each be different. The representations may include an indicator 622 of the type of source (e.g., satellite, cable, antenna, Internet, local or remote storage, DVR, VCR, streaming, website, etc.). The indicator may be shaped or colored to indicate the source. For example, a blue indicator may identify a cable source while a yellow indicator may identify an Internet source. The colored indicator may highlight the entire representation of the source or just a portion.

In some embodiments, list 620 may be interactive. The representations or indicators of content sources shown in screen 600 may be selectable. In response to receiving a user selection of one of the representations in list 620, control circuitry 304 may access the content source corresponding to the user selection. When list 620 is interactive, the user may access any content source in list 620 in any order the user chooses. Specifically, instead of control circuitry 304 accessing content sources in the list according to the order they are arranged in the list in response to user selections of option 660, the user may choose to access any given content source shown in list 620.

Control circuitry 304 may present list 620 in response to receiving a user selection of a dedicated key, on-screen option, verbal command or other suitable input. Alternatively, control circuitry 304 may present list 620 automatically in response to a new content source being added to the list of previous accessed content sources. In some implementations, control circuitry 304 may present list 620 automatically at predefined or user-defined time intervals (e.g., every 5 minutes). In some implementations, control circuitry 304 may present list 620 automatically in response to receiving a content source change or selection request from the user. In some implementations, control circuitry 304 may present list 620 automatically in response to receiving a user request to access a last content source (e.g., in response to receiving a user selection of option 660).

In response to receiving a user selection of a last content source option 660, control circuitry 304 may retrieve the list of previously accessed content sources from storage 308. The stored list may include a pointer to a content source next to be accessed. Initially, the pointer may point to the first content source in the list or a random content source in the list. Alternatively, the pointer may always point to the content source having the largest value of the view timer or the smallest value of the view timer. Control circuitry 304 may determine a position of the pointer in the list and may advance the pointer to the next adjacent content source in the list. Control circuitry 304 may retrieve the content source identifier of the next adjacent content source in the list and may access the content source to present content received from the content source. Alternatively, control circuitry 304 may first determine a position of the pointer in the list, access the content source pointed to by the pointer and subsequently advance the pointer to the next adjacent content source in the list. The list may be arranged as a circular array such that when the pointer reaches the last content source in the list, the pointer when advanced returns to point to the first content source in the list. Alternatively, the list may be arranged as straight array such that when the pointer reaches the last content source in the list, the pointer when advanced returns an exception indicating to control circuitry 304 that there are no more content sources to be accessed. In response, control circuitry 304 may present a notification to the user indicating that no additional last content sources are left to be accessed. The notification may include an option for the user to select to instruct control circuitry 304 to return to the start of the list and access the first content source in the list.

For example, a list of content sources may include four content sources (A, B, C and D). The pointer may initially point to content source B, which may be the last content source to have been added to the list or the last content source that was accessed. In response to receiving a user selection of option 660, control circuitry 304 may advance the pointer to the next adjacent content source (e.g., content source C) and may access the content source pointed to by the pointer. Specifically, control circuitry 304 may access content source C and present content from content source C. Control circuitry 304 may store the list and/or the new pointer location in storage 308. In response to receiving another user selection of option 660, control circuitry 304 may advance the pointer to the next adjacent content source (e.g., content source D) and may access the content source pointed to by the pointer. Specifically, control circuitry 304 may access content source D and present content from content source D. In response to receiving another user selection of option 660, control circuitry 304 may advance the pointer to the next adjacent content source (e.g., content source A, in the case of a circular array) and may access the content source pointed to by the pointer. Specifically, control circuitry 304 may access content source A and present content from content source A.

Figure 8:
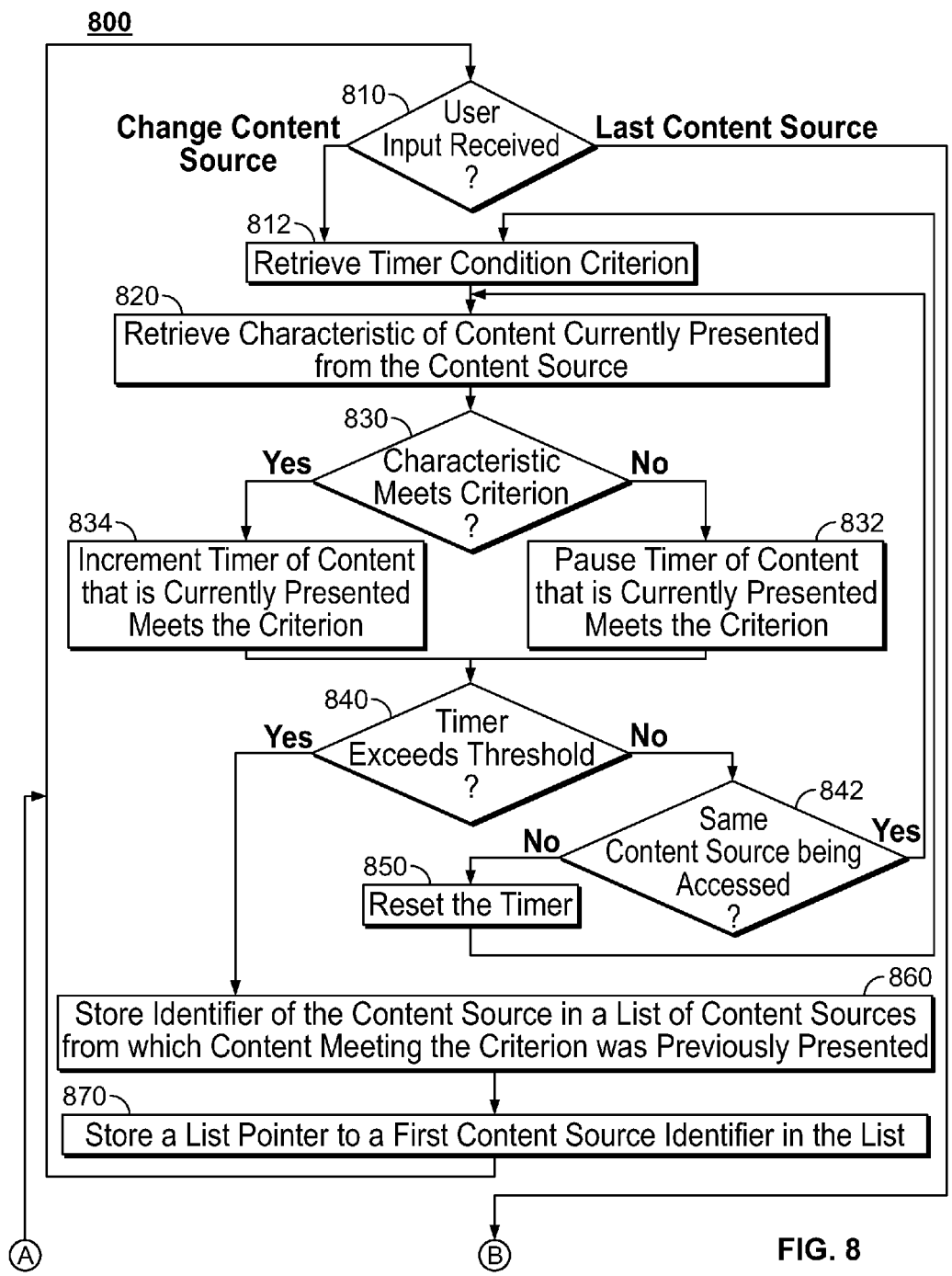
FIG. 8 is a diagram of a process for tracking content sources from which media assets have previously been viewed in accordance with embodiments of the invention.
Figure 8:
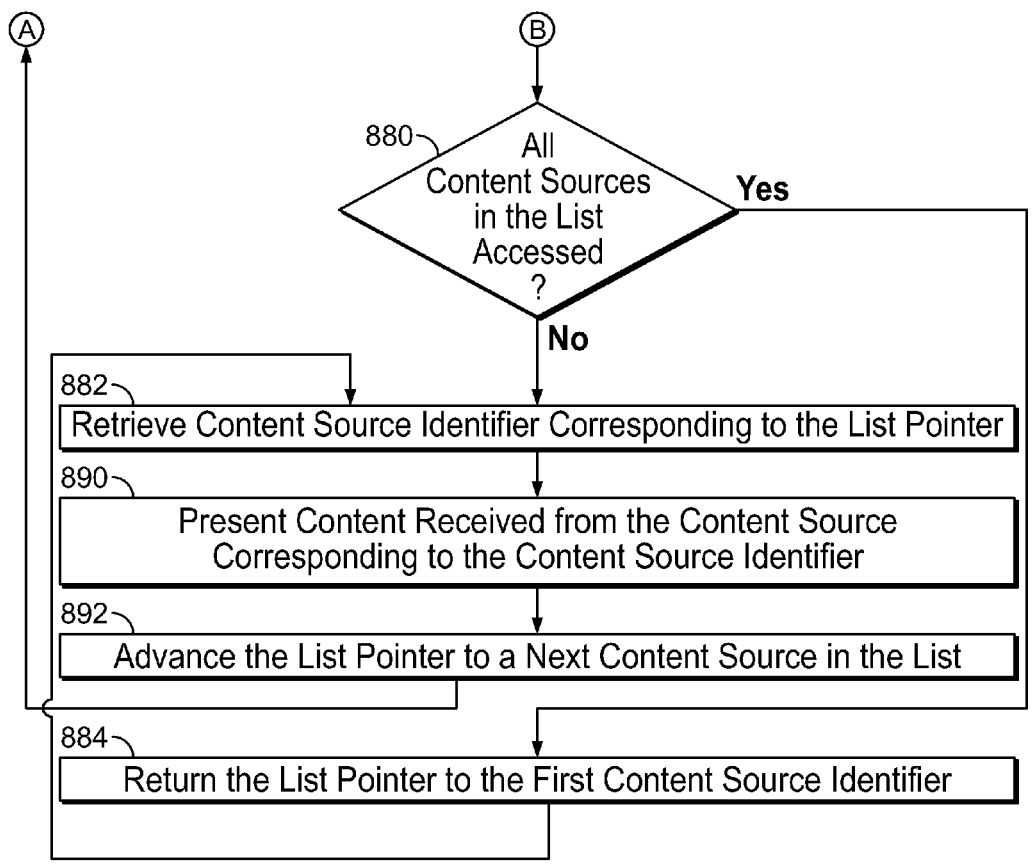

FIG. 8 is a diagram of a process 800 for tracking content sources from which media assets have previously been viewed in accordance with embodiments of the invention. At step 810, a determination is made as to what user input is received. In response to determining the user input received is a change content source command, the process proceeds to step 812 and in response to determining the user input received is a last content source command, the process proceeds to step 880. For example, control circuitry 304 may receive a user change channel command from user input interface 310 (FIG. 3) or a user selection of last content source option 660 (FIG. 6).

At step 812, a timer condition criterion is retrieved. For example, control circuitry 304 may retrieve one or more criteria set in region 520 (FIG. 5) from storage 308 or may retrieve a predefined set of criteria stored in storage 308 as default criteria.

At step 820, characteristics or attributes of content currently presented from the content source are retrieved or determined. For example, control circuitry 304 may retrieve a title and content source identifier (or current time and content source identifier) of the content being presented and prepare an SQL query that includes this information. Control circuitry 304 may transmit the SQL query to a local or remote database. The local or remote database may identify a data structure associated with the content identified by the information in the SQL query. The data structure may include characteristics or attributes of the content. The local or remote database may transmit back to control circuitry 304 the data structure with the characteristics or attributes of the content currently presented to the user. In some implementations, control circuitry 304 may perform an on-the-fly or real-time analysis of the video, audio or metadata associated with the content being presented to determine a characteristic or attribute of the content.

At step 830, a determination is made as to whether the characteristic or attribute of the content meets or matches a criterion/criteria. In response to determining the characteristic or attribute of the content meets or matches criterion/criteria, the process proceeds to step 834, otherwise the process proceeds to step 832. For example, control circuitry 304 may retrieve from the data structure associated with the content being presented one or more content characteristics or attributes and compare those characteristics or attributes to the criteria selected or set in region 520.

At step 834, a timer of content that is currently being presented and meets the criterion/criteria is incremented. For example, the timer may be incremented every second to measure the amount of time that content with attributes or characteristics matching the criterion is being presented.

At step 832, the timer of content that is currently being presented and meets the criterion/criteria is paused. For example, the current time measured by the timer may be stored in storage 308.

At step 840, a determination is made as to whether the timer exceeds a threshold. In response to determining the timer exceeds a threshold, the process proceeds to step 844; otherwise the process proceeds to step 842. For example, control circuitry 304 may compare the value of the timer (continuously or periodically) with a threshold set in region 510 to determine whether the threshold is met or exceeded.

At step 842, a determination is made as to whether the same content source is being accessed. In response to determining the same content source is being accessed, the process proceeds to step 820; otherwise the process proceeds to step 850.

At step 850, the timer is reset. For example, control circuitry 304 may set the value in the timer to the value zero.

At step 860, an identifier of the content source being accessed is stored in a list of content sources from which content meeting the criterion/criteria was previous presented. For example, a channel number or website address or URL may be stored for future reference.

At step 870, a list pointer to a first content source identifier in the list is stored.

At step 880, a determination is made as to whether all content sources in the list of previously accessed content sources have been accessed. In response to determining all content sources in the list have been accessed, the process proceeds to step 884; otherwise the process proceeds to step 882.

At step 882, a content source identifier corresponding to the list pointer is retrieved. For example, control circuitry 304 may retrieve a channel number stored in the list of previously accessed content sources.

At step 890, content received from the content source corresponding to the content source identifier is presented. For example, control circuitry 304 may tune to the channel number retrieved from the list of previously accessed content sources.

At step 892, the list pointer is advanced to the next content source in the list.

At step 884, the list pointer is returned to the first content source identifier in the list of previously accessed content sources.

It should be understood that the above steps of the flow diagram of FIG. 8 may be executed or performed in any order or sequence not limited to the order and sequence shown and described in the figure. Also, some of the above steps of the flow diagram of FIG. 8 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for returning to a content source from which a media asset has previously been received and viewed, the method comprising:
receiving, with control circuitry, a user request to access a first content source;
monitoring content currently being presented to the user from the first content source to determine whether the content meets a criterion;
measuring an amount of time the content being presented meets the criterion, wherein measuring an amount of time comprises running a timer while the content being presented meets the criterion and pausing the timer while the content being presented fails to meet the criterion, and wherein running the timer and pausing the timer are performed without receiving a request to access another content source after accessing the first content source;
in response to determining the amount of time exceeds a threshold, storing an identifier of the first content source in a list of content sources from which content meeting the criterion was previously presented to the user; and
presenting content received from one of the content sources in the list each time a user request to access a last content source is received.

2. The method of claim 1, wherein:
content received from the first content source includes a program segment and an advertising segment;
monitoring content comprises determining whether the content currently being presented corresponds to the program segment or the advertising segment; and the content currently being presented is determined to meet the criterion when the content currently being presented corresponds to the program segment.

3. The method of claim 1, wherein the criterion is a genre or category.

4. The method of claim 1, wherein the criterion is determined based on a user profile.

5. The method of claim 1, wherein the user request to access a last content source includes a user selection of a last channel option.

6. The method of claim 1 further comprising receiving user input that defines a value for the threshold.

7. The method of claim 1, wherein:
the content sources in the list are arranged in order of access; and
presenting content received from one of the content sources in the list comprises accessing each one of the content sources in the list in sequence in accordance with the order.

8. The method of claim 1 further comprising:
storing in the list the measured amount of time corresponding to each content source in the list; and
arranging the content sources in the list in order according to the measured amount of time corresponding to each content source;
wherein presenting content received from one of the content sources in the list comprises accessing each one of the content sources in the list in sequence in accordance with the order.

9. The method of claim 1, wherein the first content source is a first channel, further comprising:
tuning to the first channel in response to receiving the user request to access the first content source;
after storing the identifier of the first channel in the list, tuning to a second channel to present content received from the second channel in response to receiving a user request to tune to the second channel;
receiving a user request to access the last content source;
retrieving the identifier of the first content source in the list of content sources from which content meeting the criterion was previously presented to the user; and
tuning back to the first channel based on the retrieved identifier.

10. A system for returning to a content source from which a media asset has previously been received and viewed, the system comprising:
control circuitry configured to:
receive a user request to access a first content source;
monitor content currently being presented to the user from the first content source to determine whether the content meets a criterion;
measure an amount of time the content being presented meets the criterion, wherein the amount of time is measured by running a timer while the content being presented meets the criterion and pausing the timer while the content being presented fails to meet the criterion, and wherein running the timer and pausing the timer are performed without receiving a request to access another content source after accessing the first content source;
in response to determining the amount of time exceeds a threshold, store an identifier of the first content source in a list of content sources from which content meeting the criterion was previously presented to the user; and
present content received from one of the content sources in the list each time a user request to access a last content source is received.

11. The system of claim 10, wherein:
content received from the first content source includes a program segment and an advertising segment;
the control circuitry is further configured to determine whether the content currently being presented corresponds to the program segment or the advertising segment; and
the content currently being presented is determined to meet the criterion when the content currently being presented corresponds to the program segment.

12. The system of claim 10, wherein the criterion is a genre or category.

13. The system of claim 10, wherein the criterion is determined based on a user profile.

14. The system of claim 10, wherein the user request to access a last content source includes a user selection of a last channel option.

15. The system of claim 10, wherein the control circuitry is further configured to receive user input that defines a value for the threshold.

16. The system of claim 10, wherein:
the content sources in the list are arranged in order of access; and
the control circuitry is further configured to access each one of the content sources in the list in sequence in accordance with the order.

17. The system of claim 10, wherein the control circuitry is further configured to:
store in the list the measured amount of time corresponding to each content source in the list;
arrange the content sources in the list in order according to the measured amount of time corresponding to each content source; and
access each one of the content sources in the list in sequence in accordance with the order.

18. The method of claim 10, wherein the first content source is a first channel, wherein the control circuitry is further configured to:
tune to the first channel in response to receiving the user request to access the first content source;
after storing the identifier of the first channel in the list, tune to a second channel to present content received from the second channel in response to receiving a user request to tune to the second channel;
receive a user request to access the last content source;
retrieve the identifier of the first content source in the list of content sources from which content meeting the criterion was previously presented to the user; and
tune back to the first channel based on the retrieved identifier.

* * * * *